US012505823B2

(12) United States Patent
Li et al.

(10) Patent No.: US 12,505,823 B2
(45) Date of Patent: Dec. 23, 2025

(54) OPEN-FIELD FAR-FIELD SILENCING SPEAKER APPARATUS, HEAD-MOUNTED DEVICE AND SIGNAL PROCESSING METHOD

(71) Applicant: GOERTEK TECHNOLOGY CO., LTD., Shandong (CN)

(72) Inventors: Jinbao Li, Shandong (CN); Jinguo Zhang, Shandong (CN)

(73) Assignee: Goertek Technology Co., Ltd., Qingdao (CN)

( * ) Notice: Subject to any disclaimer, the term of this patent is extended or adjusted under 35 U.S.C. 154(b) by 155 days.

(21) Appl. No.: 18/589,906

(22) Filed: Feb. 28, 2024

(65) Prior Publication Data

US 2024/0265905 A1 Aug. 8, 2024

Related U.S. Application Data

(63) Continuation-in-part of application No. PCT/CN2022/114391, filed on Aug. 24, 2022.

(30) Foreign Application Priority Data

Aug. 31, 2021 (CN) ......................... 202111014745.X

(51) Int. Cl.
*G10K 11/178* (2006.01)
*G10K 11/00* (2006.01)
*H04R 1/02* (2006.01)

(52) U.S. Cl.
CPC ........ *G10K 11/1781* (2018.01); *G10K 11/002* (2013.01); *G10K 11/17853* (2018.01); *H04R 1/025* (2013.01); *H04R 1/028* (2013.01)

(58) Field of Classification Search
CPC ......... G10K 11/1781; G10K 11/17853; G10K 11/002; H04R 1/025; H04R 1/028
USPC ............................................................ 381/97
See application file for complete search history.

(56) References Cited

U.S. PATENT DOCUMENTS 11,706,574 B2 * 7/2023 Qi ............................ G10K 9/22 381/151
2015/0110329 A1 * 4/2015 Tanaka ................. H04R 1/1016 381/380
2023/0164497 A1 * 5/2023 Qi ........................ H04R 1/2811 381/151

FOREIGN PATENT DOCUMENTS

| | | | | |
|---|---|---|---|---|
| CN | 210958769 U | | 7/2020 | |
| CN | 111771387 A | | 10/2020 | |
| CN | 113225643 A | | 8/2021 | |
| JP | H03284098 A | | 12/1991 | |
| KR | 20230107648 A | * | 7/2023 | ............. H04R 1/105 |

* cited by examiner

*Primary Examiner* — Sean H Nguyen
(74) *Attorney, Agent, or Firm* — Baker Botts LLP

(57) ABSTRACT

The present disclosure provides a speaker device, head-mounted device, and signal processing method. The speaker device includes: a first housing and a first speaker unit, the first speaker unit being provided inside the first housing and separating the first housing into a first front sound cavity and a first rear sound cavity; the first housing is opened thereon with at least one first sound emission holes and at least one first sound leakage holes, the first sound emission holes being in communication with the first front sound cavity, and the first sound leakage holes being in communication with the first rear sound cavity.

20 Claims, 5 Drawing Sheets

OPEN-FIELD FAR-FIELD SILENCING SPEAKER APPARATUS, HEAD-MOUNTED DEVICE AND SIGNAL PROCESSING METHOD

CROSS-REFERENCE TO RELATED APPLICATIONS

This application is a continuation-in-part of International Application No. PCT/CN2022/114391, filed on Aug. 24, 2022, which claims priority to Chinese Patent Application No. 202111014745.X, filed on Aug. 31, 2021, both of which are hereby incorporated by reference in their entireties.

TECHNICAL FIELD

The present application relates to the technical field of head-mounted equipment, and specifically relates to a speaker device, a head-mounted device, and a signal processing method.

BACKGROUND

Existing electronic devices are equipped with sound systems, such as mobile phones equipped with speaker systems, allowing users to answer calls and play sound out loud, or head-mounted devices such as AR/VR/MR/audio glasses equipped with speaker systems, allowing users to have a better experience.

However, existing electronic devices equipped with sound systems designed for open spaces can generate significant sound leakage, such as when a mobile phone is receiving a call, the sound emitted from the internal speaker will propagate to the surrounding environment, or when AR/VR/MR/audio glasses and other head-mounted devices are in use, the sound played by the internal speaker will propagate to the surrounding environment. This can result in leakage of personal privacy information, and the leaked sound can cause sound pollution to the surrounding environment.

SUMMARY

One or more embodiments of the present disclosure aims to provide a speaker device, head-mounted device, and signal processing method to solve the problem of sound leakage in existing electronic devices in open-field/far-field.

In a first aspect, one or more embodiments of the present disclosure provides a speaker device, comprising a first housing and a first speaker unit, the first speaker unit being provided inside the first housing and separating the first housing into a first front sound cavity and a first rear sound cavity; the first housing is opened thereon with at least one first sound emission holes and at least one first sound leakage holes, all of the first sound emission holes being in communication with the first front sound cavity, and all of the first sound leakage holes being in communication with the first rear sound cavity; wherein all of the first sound emission holes are spaced from all of the first sound leakage holes by a first spacing distance, at least one of the first sound emission holes and at least one of the first sound leakage holes being provided facing a side towards a first muffling position, so that sound waves emitted through at least one of the first sound emission holes and sound waves emitted through at least one of the first sound leakage holes are superimposed at the first muffling position.

Optionally, the speaker device further comprises a second housing and a second speaker unit, the second speaker unit being provided inside the second housing and separating the second housing into a second front sound cavity and a second rear sound cavity; the second housing is opened thereon with at least one second sound emission holes, all of the second sound emission holes being in communication with the second front sound cavity;

all of the second sound emission holes are spaced from all of the first sound emission holes by a second spacing distance, at least one of the second sound emission holes being provided facing a side towards a second muffling position, so that sound waves emitted through at least one of the second sound emission holes and sound waves emitted through at least one of the first sound emission holes are superimposed at the second muffling position.

Optionally, the second rear sound cavity is smaller in volume than the first rear sound cavity.

Optionally, the second housing is provided thereon with a second sound leakage hole, which is in communication with the second rear sound cavity and is smaller than the first sound leakage hole.

Optionally, the first housing and the second housing constitute an integrated structure.

Optionally, the first muffling position and the second muffling position are in the same position.

In a second aspect, one or more embodiments of the present disclosure provides a head-mounted device, which includes the speaker device as described above.

Optionally, the head-mounted device comprises AR/VR/MR/audio glasses, the AR/VR/MR/audio glasses comprising a frame and a temple, one end of the temple being provided on the frame, and the speaker device being provided on the temple.

Optionally, the temple is the first housing, a side of the temple facing the frame being the first side, a side of the temple facing away from the first side being the second side, a side of the temple adjacent to the first side and facing the ear being the third side, and a side of the temple facing away from the third side being the fourth side, the first speaker unit being provided proximate to the third side of the temple; and wherein the first sound emission hole is opened on the third side of the temple, the first sound leakage hole is opened on both sides of the first sound emission hole along the extension direction of the third side of the temple, and the first sound leakage hole is opened on the second side of the temple.

Optionally, the second side of the temple has part of a surface thereof sunken to form a stepped structure, on which the first sound leakage hole is opened.

Optionally, the head-mounted device further comprises a second speaker unit provided within the temple and distal to the third side of the temple, and wherein the second sound emission holes are opened on the second side and the fourth side of the temple, and there are less second sound emission holes opened on the second side of the temple than those opened on the fourth side of the temple.

In a third aspect, one or more embodiments of the present disclosure provides a signal processing method applicable to the speaker device described above, comprising:

distributing an input signal at least into a wanted signal and at least two tributary signals;

processing the wanted signal, and transmitting a processed wanted signal to a first speaker unit;

processing separately all the tributary signals, superimposing all processed tributary signals to form a total tributary signal, and transmitting the total tributary signal to a second speaker unit; wherein processing separately all the tributary signals comprises filtering all the tributary signals to extract signals in a specific frequency domain, and the phase of any processed tributary signal is opposite to that of the wanted signal.

Optionally, processing the wanted signal comprises: filtering process, gain adjustment, PEQ comb filtering process, and time delay process.

Optionally, processing separately all of the tributary signals further comprises performing gain adjustment and PEQ comb filtering process on the signals in the specific frequency domain.

Optionally, a phase reversal process is performed before the gain adjustment, and/or a delay process is performed after the PEQ comb filtering process.

Optionally, the total tributary signal is subjected to PEQ correction before being transmitted to the second speaker unit.

In a fourth aspect, one or more embodiments of the present disclosure provides a head-mounted device, comprising: a processor; and a memory having stored thereon programs or instructions executable on the processor, which programs or instructions implement steps of the signal processing method as described above when being executed by the processor.

One technical effect of the present disclosure is that the sound waves emitted from the first sound emission hole on the speaker device are superimposed with the sound waves emitted from the first sound leakage hole on the speaker device, thereby canceling at least some of the sound waves emitted from the first sound emission hole with the sound waves emitted from the first sound leakage hole, providing favorable conditions for solving the problem of sound leakage in open-field/far-field of existing electronic devices.

Other features and advantages of the present disclosure will become clear through the detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

REFERENCE SIGNS

1. First housing; 2. First speaker unit; 3. First front sound cavity; 4. First rear sound cavity; 5. First sound emission hole; 6. First sound leakage hole; 7. Second housing; 8. Second speaker unit; 9. Second front sound cavity; 10. Second rear sound cavity; 11. Second sound emission hole; 12. Temple; 13. Ear hole.

DETAILED DESCRIPTION

Various exemplary embodiments of the present disclosure will now be described with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further reference thereof may be omitted in the subsequent drawings.

Figure 3:
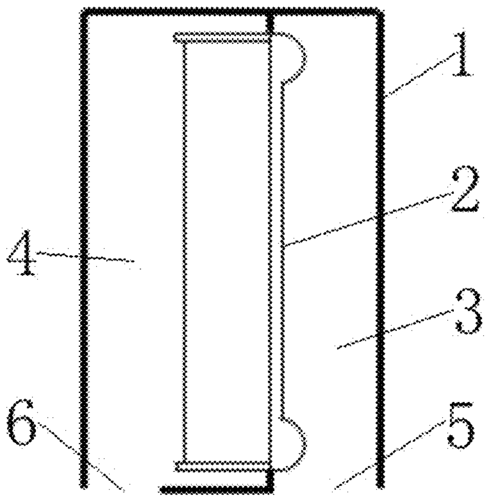
FIG. 3 is a schematic illustration of the structure of a first housing and a first speaker unit.

In a first aspect, one or more embodiments of the present disclosure provides a speaker device, as shown in FIG. 3, which comprises a first housing 1 and a first speaker unit 2. The first housing 1 can be a casing of an electronic device, for example, placing the first speaker unit 2 inside a casing of the electronic device so that the structure of the casing of the electronic device is suitable for installing the first speaker unit 2. The first housing 1 can also be a casing specifically designed for the first speaker unit 2, placing the first speaker unit 2 inside the above casing. The first speaker unit 2 can be a speaker unit with a diaphragm, such as a moving coil or moving iron type structure. The first housing 1 has a cavity, and the first speaker unit 2 is placed inside the first housing 1. The first speaker unit 2 separates the first housing 1 into a first front sound cavity 3 and a first rear sound cavity 4 that are isolated from each other, wherein, a cavity facing the diaphragm on the first speaker unit 2 is the first front sound cavity 3, and the other cavity is the first rear sound cavity 4.

The first housing 1 is opened with at least one first sound emission holes 5 and at least one first sound leakage holes 6. All the first sound emission holes 5 are in communication with the first front sound cavity 3, and all the first sound leakage holes 6 are in communication with the first rear sound cavity 4. The first sound emission holes 5 are the main sound emission part of the electronic device for the user to listen to. There may be a plurality of the first sound emission holes 5, and multiple first sound emission holes 5 can be arranged according to actual needs. For example, the number of the first sound emission holes 5 can be three, and three first sound emission holes 5 are arranged in a surrounding way to provide better sound effect for the user. Of course, the number of the first sound emission hole 5 can also be one, and the one sound emission hole is provided near the human ear so as to reduce sound leakage. The first sound leakage holes 6 can balance the air pressure between the first rear sound cavity 4 and the outside when the diaphragm of the first speaker unit 2 vibrates, so that the diaphragm maintains good vibration performance. In addition, in this disclosure, the first sound leakage holes 6 also have the function of leaking the sound waves generated in the first rear sound cavity 4. There may be a plurality of the first sound leakage holes 6, and multiple first sound leakage holes 6 can be arranged according to actual needs. No further elaboration is needed here for specific number and arrangement of the first sound leakage holes 6.

All of the at least one first sound emission holes 5 are spaced from all of the at least one first sound leakage holes 6 by a first spacing distance, and the at least one first sound emission holes 5 and the at least one first sound leakage holes 6 are provided facing the first muffling position. That is to say, connecting lines between one of the first sound emission holes 5, one of the first sound leakage holes 6, and the first muffling position constitute a triangle. The sound waves emitted from the first sound emission holes 5 propagate towards the muffling position, and the sound waves emitted from the first sound leakage holes 6 also propagate towards the muffling position, so that the sound waves emitted via the at least one first sound emission holes 5 and the sound waves emitted via the at least one first sound leakage holes 6 are superimposed at the first muffling position. As all of the at least one first sound emission holes 5 are spaced from all of the at least one first sound leakage holes 6 by the first spacing distance, it can be ensured that the sound waves emitted from the first sound emission holes 5 and the sound waves emitted from the first sound leakage holes 6 are superimposed at a relatively distant muffling position without influencing near-field sound propagation.

The first muffling position may be an area where the sound waves emitted from the first sound emission holes 5 and the sound waves emitted from the first sound leakage holes 6 are superimposed, that is, the first muffling position may be an area where the sound waves emitted from the first sound emission hole 5 and the sound waves emitted from the first sound leakage hole 6 are superimposed to achieve a muffling effect. At the same time, at least one of the first sound emission holes 5 and at least one of the first sound leakage holes 6 are provided facing a side towards the first muffling position, including the case where the first sound emission holes 5 and the first sound leakage holes 6 are spatially aligned with the side towards the first muffling position, and also including the case where the first sound emission holes 5 and the first sound leakage holes 6 are spatially offset from the side towards the first muffling position. For example, the first sound emission hole 5 may not be directly aligned with the first muffling position, but the sound waves emitted from the first sound emission hole 5 may propagate to the first muffling position. For example, the first housing 1 has a first outer surface and a second outer surface adjacent to the first outer surface, where the first outer surface is directly aligned with the side towards the listening position, but the first sound emission holes 5 and/or the first sound leakage holes 6 are opened on the second outer surface. The orientation of the first sound emission holes 5 and the first sound leakage holes 6 may be such that the first sound emission holes 5 are aligned with a side towards the listening position, and the first sound leakage holes 6 are offset from the side towards the listening position. Those skilled in the art may set an offset angle according to their actual needs for muffling effects, such as an offset angle of 45°, 90°, etc. The specific offset angle is not specifically limited in this disclosure. When the center line of the hole passes through the listening position, the offset angle is 0°; and as the center line of the hole deviates farther from the listening position, its offset angle increases.

In order to satisfy the requirement that at least one of the first sound emission holes 5 and at least one of the first sound leakage holes 6 are provided facing a side towards the first muffling position, the center line of the first sound emission hole 5 and the center line of the first sound leakage hole 6 may be provided to intersect, so that the sound waves emitted from the first sound emission hole 5 and the sound waves emitted from the first sound leakage hole 6 can be superimposed. For example, the angle between the center line of the first sound emission hole 5 and the outer surface of the first housing 1 where the first sound emission hole 5 is opened may be less than 90°, so that the sound waves emitted from the first sound emission hole 5 and the sound waves emitted from the outer surface of the first housing 1 where the first sound emission hole 5 is opened are not perpendicular to each other. The angle between the center line of the first sound leakage hole 6 and the outer surface of the first housing 1 where the first sound leakage hole 6 is opened may be less than 90°, so that the sound waves emitted from the first sound leakage hole 6 and the sound waves emitted from the outer surface of the first housing 1 where the first sound leakage hole 6 is opened are not perpendicular to each other. Alternatively, for example, the first housing 1 where the first sound emission hole 5 and the first sound leakage hole 6 are opened may be of an irregular structure, such as an outer surface having both an arc-shaped outer surface and a flat outer surface, where the first sound emission hole 5 and the first sound leakage hole 6 may be provided on the arc-shaped outer surface, so that the center line of the first sound emission hole 5 and the center line of the first sound leakage hole 6 intersect. Of course, the first housing 1 may also be of other irregular structures, as long as the center line of the first sound emission hole 5 and the center line of the first sound leakage hole 6 intersect.

Figure 7:
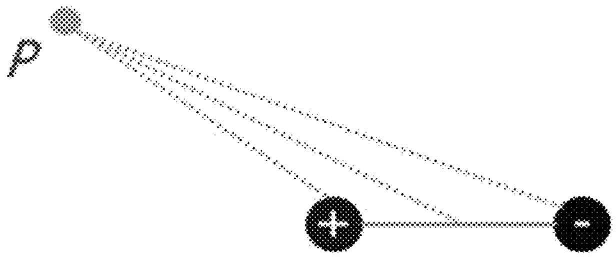
FIG. 7 is a first schematic illustration of the muffling of a positive sound source and a negative sound source at the muffling position P.
Figure 8:
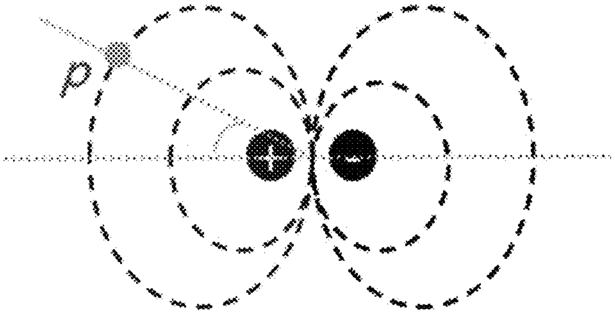
FIG. 8 is a second schematic illustration of the muffling of a positive sound source and a negative sound source at the muffling position P.

The muffling principle of this disclosure can be described as follows: as shown in FIG. 7 and FIG. 8, when the diaphragm of the first speaker unit 2 vibrates, the sound waves emitted from the first front sound cavity 3 through the first sound emission hole 5 can be defined as positive phase sound waves, and the sound waves emitted from the first rear sound cavity 4 through the first sound leakage hole 6 can be defined as negative phase sound waves. When positive and negative phase sound waves propagate in the air, they undergo positive and negative sound wave synthesis and cancel each other to a certain extent, thus achieving the purpose of open-field/far-field muffling. When the first muffling position is located at 5300 mm from the first sound emission hole, the sound waves emitted from the first sound leakage hole 6 can attenuate the sound waves emitted from the first sound emission hole 5 by more than 40 dB between 20 HZ-1 KHZ, resulting in a leakage muffling effect.

Figure 4:
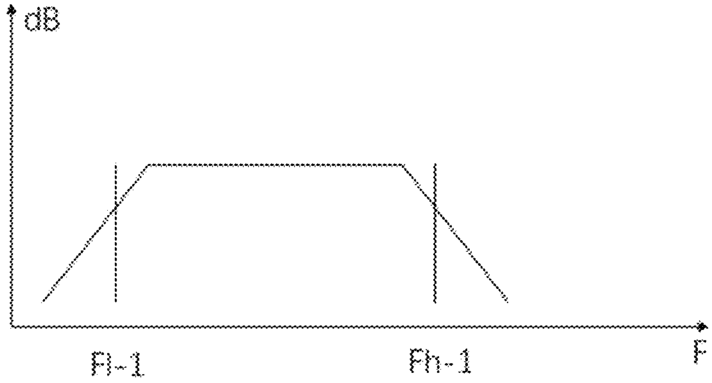
FIG. 4 is a schematic illustration of a frequency domain where the sound waves emitted from the first sound emission hole and the sound waves emitted from the first sound leakage hole canceling each other out.

One or more embodiments of the present disclosure achieves the superposition of sound waves emitted from the first sound emission hole 5 on the speaker device and sound waves emitted from the first sound leakage hole 6 on the speaker device, thereby canceling at least some of the sound waves emitted from the first sound emission hole 5 with the sound waves emitted from the first sound leakage hole 6, providing favorable conditions for solving the problem of sound leakage in open fields of existing electronic devices. This can avoid as much as possible the leakage of personal privacy information, and the problem of environmental pollution caused by sound leakage. At the same time, due to the fact that the sound waves emitted from the first sound emission hole and the first sound leakage hole 6 in one or more embodiments of the present disclosure come from the vibration of the same diaphragm, as shown in FIG. 4, the sound waves emitted from the first sound leakage hole 6 can cancel out the sound waves emitted from the first sound emission hole 5 within a wide frequency range. In other words, this disclosure can substantially solve the problem of muffling in open fields of wideband.

Figure 5:
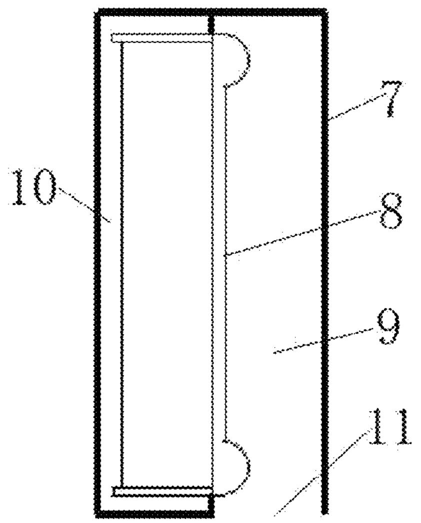
FIG. 5 is a schematic illustration of the structure of a second housing and a second speaker unit.

Optionally, as shown in FIG. 5, the speaker device also includes a second housing 7 and a second speaker unit 8. The second housing 7 can be a casing of an electronic device, such as placing the second speaker unit 8 inside the casing of the electronic device so that the structure of the casing of the electronic device is suitable for installing the second speaker unit 8. The second housing 7 can also be a casing designed specifically for the second speaker unit 8, placing the second speaker unit 8 inside the above casing. The second speaker unit can be a speaker unit with a diaphragm, such as a moving coil or a moving iron type structure. The second housing 7 has a cavity, and the second speaker unit 8 is placed inside the second housing 7. The second speaker unit 8 separates the second housing 7 into a second front sound cavity 9 and a second rear sound cavity 10 that are isolated from each other. The cavity facing the diaphragm on the second speaker unit 8 on the second housing 7 is the second front sound cavity 9, and the other cavity is the second rear sound cavity 10. At least one second sound emission holes 11 is opened on the second housing 7, and all of the second sound emission holes 11 are in communication with the second front sound cavity 9. The sound waves emitted from the second speaker unit 8 through the second sound emission hole 11 are mainly to cancel out the sound waves emitted from the first speaker unit 2 in the far-field. There may be provided a plurality of second sound emission holes 1, and multiple second sound emission holes 11 can be arranged according to actual needs. For example, the number of second sound emission holes 11 can be three, and the three second sound emission holes 11 are arranged in a row. Of course, the second sound emission holes 11 can also be of other numbers or other arrangements, which are not listed here one by one.

All the second sound emission holes 11 are spaced from all the first sound emission holes 5 by a second spacing distance. At least one of the second sound emission holes 11 is provided facing a side towards the second muffling position. That is to say, connecting lines between one of the second sound emission holes 11, one of the first sound emission holes 5, and the second muffling position forms a triangular structure. The sound waves emitted from the second sound emission holes 11 propagate towards the second muffling position, so that the sound waves emitted from the first sound emission holes 5 after cancellation by the sound waves emitted through the first sound leakage hole 6 also propagate towards the second muffling position, allowing the sound waves emitted through at least one of the second sound emission holes 11 and the sound waves emitted through the at least one first sound emission hole 5 to be superimposed at the second muffling position. The second spacing distance between all the second sound emission holes 11 and all the first sound emission holes 5 ensures that the sound waves emitted from the second sound emission holes 11 and the sound waves emitted from the first sound emission holes 5 can be superimposed at a relatively distant muffling position without influencing near-field sound propagation.

The second muffling position may be an area where the sound waves emitted from the first sound emission hole 5 after being cancelled by the sound waves emitted from the first sound leakage hole 6 and the sound waves emitted from the second sound emission hole 11 are superimposed, and the muffling effect can be achieved in this area. At least one of the second sound emission holes 11 is provided on a side towards the second muffling position, including the case where the second sound emission hole 11 and the first sound emission hole 5 are spatially aligned with a side towards the first muffling position, and also including the case where the second sound emission hole 11 and the first sound emission hole 5 are spatially offset from the side towards the first muffling position. For the meanings of alignment and offset, please refer to the relevant disclosure above, and no further elaboration is needed here.

In order to satisfy the requirement that at least one of the second sound emission holes 11 is provided facing a side towards the second muffling position, the center line of the second sound emission holes 11 and the center line of the first sound emission holes 5 may be provided to intersect, so that the sound waves emitted from the second sound emission holes 11 and the sound waves emitted from the first sound emission holes 5 can be superimposed.

Due to the closed second rear sound cavity 10 formed by the second housing 7 and the second speaker unit 8, which second rear sound cavity 10 is optionally of a volume smaller than or equal to 10% of that of the first rear sound cavity, the second speaker unit 8 and the second housing 7 can emit a sound wave of the same phase through the second sound emission hole 11, ensuring that the sound wave is in inverse phase with the sound wave emitted from the first sound emission hole 5, so that the sound waves emitted from the second sound emission holes 11 in inverse phase with the sound waves emitted from the first sound emission holes can be superimposed at the second muffling position and canceled out to a certain extent, thereby further eliminating the effect of sound leakage in the open-field/far-field. When the second muffling position is 5300 mm away from the first sound emission holes, the sound wave emitted from the second sound emission hole s11 can form a leakage muffling effect on the sound waves emitted from the first sound emission holes 5 by more than 20 dB at a frequency of 1 KHZ-12 KHZ.

Figure 6:
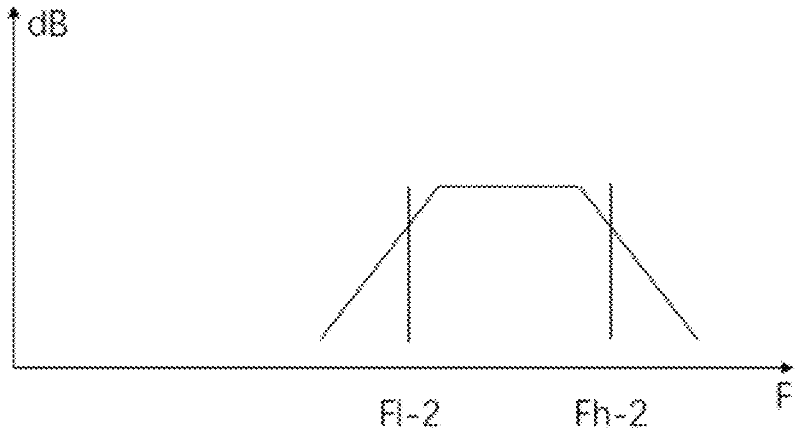
FIG. 6 is a schematic illustration of a frequency domain where the sound waves emitted from the second sound emission hole and the sound waves emitted from the first sound emission hole cancel each other out.

Alternatively, the second rear sound cavity 10 is smaller in volume than that of the first rear sound cavity 4, which can ensure that the volume of the second rear sound cavity 10 is small, reducing the occupied space of the second housing 7 and ensuring that the overall speaker structure is of a moderate volume. At the same time, because the sound waves emitted from the first sound leakage holes 6 do not cancel out the high-frequency sound waves emitted from the first sound emission holes 5, and the small volume of the second rear sound cavity 10 can make the sound waves emitted from the second sound emission holes have a higher frequency, as shown in FIG. 6, the sound waves emitted from the second sound emission holes 11 can just cancel out the high-frequency sound waves emitted from the first sound emission holes 5, further ensuring the open-field/far-field muffling effect of this disclosure. Here, as shown in FIG. 5, in the case that the bottom areas of the second rear sound cavity 10 and the second front sound cavity 9 are the same, the thickness of the second rear sound cavity 10 and the thickness of the second front sound cavity 9 are different. The thickness of the second rear sound cavity 10 can be 0.5 mm to 1 mm, and the thickness of the second front sound cavity 9 can be 1.5 mm to 2 mm. As shown in FIG. 3, the first rear sound cavity 4 and the first front sound cavity 3 can be of the same volume.

Optionally, the second housing 7 is provided thereon with a second sound leakage hole, which is in communication with the second rear sound cavity 10 and is smaller than the first sound leakage hole 6. The second sound leakage hole here is only used to balance the pressure between the second rear sound cavity 10 and the outside world, so that the diaphragm on the second speaker unit 8 has better vibration performance without the need to transmit sound waves through the second sound leakage hole. Therefore, the diameter of the second sound leakage hole should be smaller than that of the first sound leakage hole 6. Further, the opening position of the second sound leakage hole can be located on the second housing 7 right opposite to the diaphragm of the second speaker unit 8, so as to better balance the pressure between the second rear sound cavity 10 and the outside world.

Optionally, the first housing 1 and the second housing 7 constitute an integrated structure, which can reliably determine the relative positions between the first sound emission hole 5, the first sound leakage hole 6, and the second sound emission hole 11, ensuring a more precise muffling effect and range. Specifically, the first housing 1 and the second housing 7 are both part of an electronic device casing, which can be formed by injection molding. The first housing 1 and the second housing 7 can be molded at the same time during injection molding. For example, the electronic device is AR/VR/MR/audio glasses, and the speaker device of one or more embodiments of the present disclosure is provided on one of the temples 12 of the glasses. The above-mentioned temple 12 may be both the first housing 1 and the second housing 7, where the first sound emission holes 5, the first sound leakage holes 6, and the second sound emission holes 11 are all opened on the outer surface of the temple 12. Of course, the first housing 1 and the second housing 7 may be other than an integrated structure: the first housing 1 and the first speaker unit 2 constitute one independent structure, while the second housing 7 and the second speaker unit 8 constitute another independent structure, these two structures being separately installed on the electronic device.

Alternatively, the first muffling position and the second muffling position are in the same position, that is, the center line of the first sound emission holes 5, the center line of the first sound leakage holes 6, and the center line of the second sound emission holes 11 converge at the same muffling position. That is to say, the sound waves emitted from the first sound emission holes 5, the sound waves emitted from the first sound leakage holes 6, and the sound waves emitted from the second sound emission holes 11 overlap at the same position to achieve a muffling effect, ensuring the reliability of muffling.

In a second aspect, one or more embodiments of the present disclosure provides a head-mounted device, including the speaker device described above, which can eliminate the problem of sound leakage caused by the head-mounted device in open-field/far-field as much as possible, avoid leakage of private information and avoid sound pollution to the surrounding environment. The head-mounted device includes AR/VR/MR/audio glasses, which include a frame and a temple 12. One end of the temple 12 is provided on the frame, and the speaker device is provided on the temple 12. When the AR/VR/MR/audio glasses are worn, the distance between the first sound emission holes 5 and the earholes 13 of the human ear can be 20 mm to 50 mm.

The temple 12 may include a first half housing and a second half housing, and the first half housing and the second half housing are fastened to form the outer housing of the temple 12. At this time, the arrangement of the first speaker unit 2, the first front sound cavity 3, and the first rear sound cavity 4 may be such that the first front sound cavity 3 is formed in the first half housing, the first rear sound cavity 4 is formed in the second half housing, and the first speaker unit 2 is sandwiched between the first half housing and the second half housing. Alternatively, the arrangement of the first speaker unit 2, the first front sound cavity 3, and the first rear sound cavity 4 may be such that all of the first speaker unit 2, the first front sound cavity 3, and the first rear sound cavity 4 are provided on the first half housing or the second half housing. When a second speaker unit 8, a second front sound cavity 9, and a second rear sound cavity 10 are all provided in the temple 12 including a first half housing and a second half housing, the arrangement of the second speaker unit 8, the second front sound cavity 9, and the second rear sound cavity 10 is provided by referring to the arrangement of the first speaker unit 2, the first front sound cavity 3, and the first rear sound cavity 4 in the first half housing and the second half housing, no further elaboration is needed here.

Alternatively, the temple 12 is the first housing 1: a side of the temple 12 facing the frame is the first side, a side of the temple 12 opposite to the first side is the second side, a side of the temple 12 adjacent to the first side and facing the ear is the third side, and a side of the temple 12 facing away from the third side is the fourth side. The first speaker unit 2 is provided proximate to the third side of the temple 12, and the first sound emission hole 5 is opened on the third side of the temple 12. The first sound leakage holes 6 are opened on both sides of the first sound emission holes 5 along the extension direction of the third side of the temple 12. Additionally, the first sound leakage holes 6 are opened on the second side of the temple 12, and placing the first sound emission hole 5 on a side of the temple 12 facing the ear can avoid sound dissipation and ensure the listening effect of the wearer. The first sound leakage holes 6 are opened on both sides of the first sound emission hole 5, allowing the first sound leakage holes 6 to surround the first sound emission hole 5, ensuring the muffling effect of the product. Additionally, opening the first sound leakage holes 6 along the extension direction of the third side of the temple 12 enables a better fit between the first sound emission hole 5 and first sound leakage holes 6 and ensures that the holes are distributed reasonably in structure and achieve muffling effects. Opening first sound leakage holes 6 on the second side of the temple 12 can achieve better muffling effects in combination with opening first sound leakage holes 6 on the third side of the temple 12.

Optionally, part of the surface of the second side of the temple 12 is sunken to form a stepped structure, and the first sound leakage hole 6 is opened on the stepped structure, which enables the first sound leakage holes 6 opened on the third side and second side of the temple 12 to evenly surround the first sound emission hole 5, so that the distance between each first sound leakage hole 6 and the first sound emission hole 5 does not vary too much, ensuring muffling effect. Secondly, it can reduce the volume of the temple 12 and ensure the comfort of the wearer.

Optionally, the head-mounted device also includes a second speaker unit 8, which is provided within the temple 12. In this case, the temple 12 is the second housing 7, and the second speaker unit 8 is provided distal to the third side of the temple 12, making the arrangement of the second speaker unit 8 in the temple 12 more reasonable, avoiding over-intense distribution of components therein. Second sound emission holes 11 are opened on both the second side and the fourth side of the temple 12, so that the second sound emission holes 11 face a second muffling position in the far-field, and the sound waves emitted from the second sound emission holes 11 may smoothly propagate to the second sound muffling position, achieving a better sound muffling effect. There are less second sound emission holes opened on the second side of the temple 12 than those opened on the fourth side of the temple 12, because the second side of the temple 12 is just the side of the temple 12 facing away from the human face and facing the outside nearly in parallel when the glass is being worn, the sound waves emitted from the second sound emission holes 11 on the second side of the temple 12 play a major role in muffling; on the other hand, the fourth side of the temple 12 is the side of the temple 12 facing the sky, and the second sound emission holes 11 opened on the fourth side of the temple 12 only serve as an auxiliary muffling effect: the location and quantity distribution of the second sound emission holes 11 are scientifically reasonable.

Figure 1:
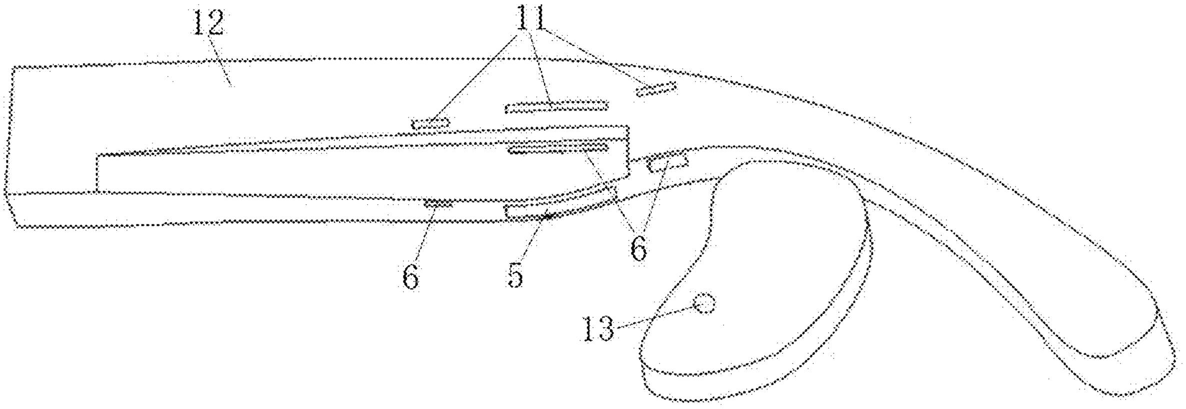
FIG. 1 is a schematic illustration of the structure of an eyeglass temple.
Figure 2:
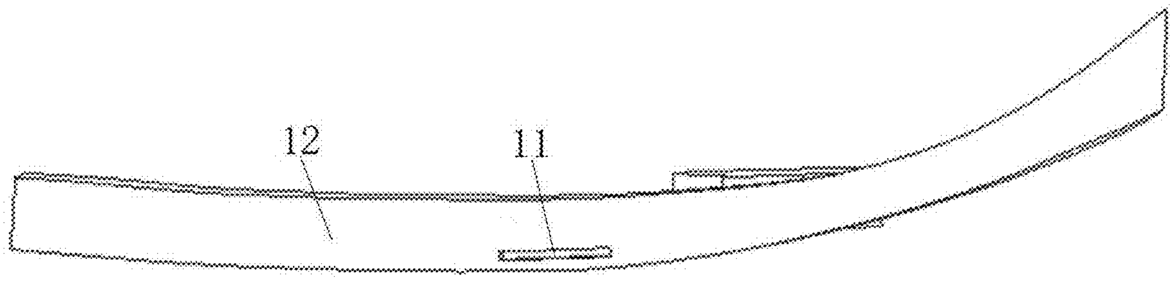
FIG. 2 is a top view of the structure of the eyeglass temple.

Specifically, as shown in FIG. 1 and FIG. 2, the temple 12 includes a support part, a connection part, and a hanger part. The connection part is located in the middle of the temple 12, and its two ends are connected to the support part and the hanger part respectively. The first housing 1 and the second housing 7 are integrally provided with the temple 12. The first speaker unit 2 and the second speaker unit 8 are provided inside the temple 12. Along the length direction of the temple 12, a first sound emission hole 5 and two first sound leakage holes 6 are opened on the first surface near the ear on the connection part. The first sound emission hole 5 is located between the two first sound leakage holes 6, and a second surface adjacent to the first surface is provided with a first sound leakage hole 6 which cooperates with the two first sound leakage holes 6 on the first surface to jointly cancel some of the sound waves emitted from the first sound emission hole 5. Along the length direction of the temple 12, three second sound emission holes 11 are opened on the third surface adjacent to the first surface on the connection part. The sound waves emitted from the three second sound emission holes 11 can cancel at least some of the sound waves emitted from the first sound emission hole 5.

In the third aspect, one or more embodiments of the present disclosure provides a signal processing method applicable to the speaker device described above, which separates the input signal into at least a wanted signal and at least two tributary signals. The input signal can be distributed by an audio signal distributor in a directional manner, where the input signal can be an audio signal of an L channel or an R channel.

Processing the wanted signal, and transmitting a processed wanted signal to the first speaker unit 2;

Processing separately all the tributary signals, superimposing all processed tributary signals to form a total tributary signal, and transmitting the total tributary signal to a second speaker unit 8. The processed wanted signal is power-amplified by a first power amplifier before driving the first speaker unit 2, and the total tributary signal is power-amplified by a second power amplifier before driving the second speaker unit 8.

The processing separately all the tributary signals includes filtering all the tributary signals to extract signals in a specific frequency domain. The frequency domain of the extracted signals can be determined according to the sound wave signals emitted from the first speaker unit 2 in practice. For example, when the diaphragm of the first speaker unit 2 vibrates, the sound emitted is determined by multiple factors, such as the process and structure of the first speaker unit 2, and the electronic components inside the first speaker unit 2. These factors result in multiple different frequency domains of the sound emitted from the first speaker unit 2, and each tributary signal can be extracted by a filter corresponding to the frequency domain, which can then be used to cancel out the sound wave emitted from the second speaker unit 8 with the sound wave emitted from the first speaker unit 2. Therefore, the number of tributary signals can be determined according to the sound wave actually emitted from the first speaker unit 2. The phase of any processed tributary signal is opposite to that of the wanted signal, which can ensure that the sound waves emitted from the tributary signals and the sound waves emitted from the first speaker unit 2 cancel out each other in the far-field.

One or more embodiments of the present disclosure can process the input signal in a targeted way, and the speaker device receives the signal processed by the method of one or more embodiments of the present disclosure, which can reliably cancel the sound waves emitted from the first speaker unit 2 in the far-field, providing favorable conditions for solving the problem of sound leakage in open-field/far-field of existing electronic devices.

Alternatively, processing the wanted signal includes filtering process, gain adjustment, PEQ comb filtering process, and time delay process, while simultaneously processing separately all of the tributary signals also includes gain adjustment and PEQ comb filtering process on the signals in the specific frequency domain, to enable reliable sound emission from the first speaker unit 2 and the second speaker unit 8, and provide favorable conditions for canceling out sound waves emitted from the first speaker unit 2 through the first sound emission hole 5 in the far-field.

Alternatively, performing a phase reversal process before the gain adjustment can cause the sound waves emitted from the tributary signal through the second speaker unit 8 to have an opposite phase to the sound waves emitted from the first speaker unit 2 through the first sound emission hole 5, providing favorable conditions for canceling the leaked sound in the far-field, and/or performing a time delay process after the PEQ comb filtering process to maximize the reliability of sound wave cancellation. In the case where the tributary signal produces a relatively small impact on the sound waves emitted from the first speaker unit 2 through the first sound emission hole 5, the tributary signal may refrain from a delay process.

Optionally, before the total tributary signal is transmitted to the second speaker unit 8, the total tributary signal is subjected to PEQ correction to ensure the reliability of sound emission from the speaker device.

Figure 9:
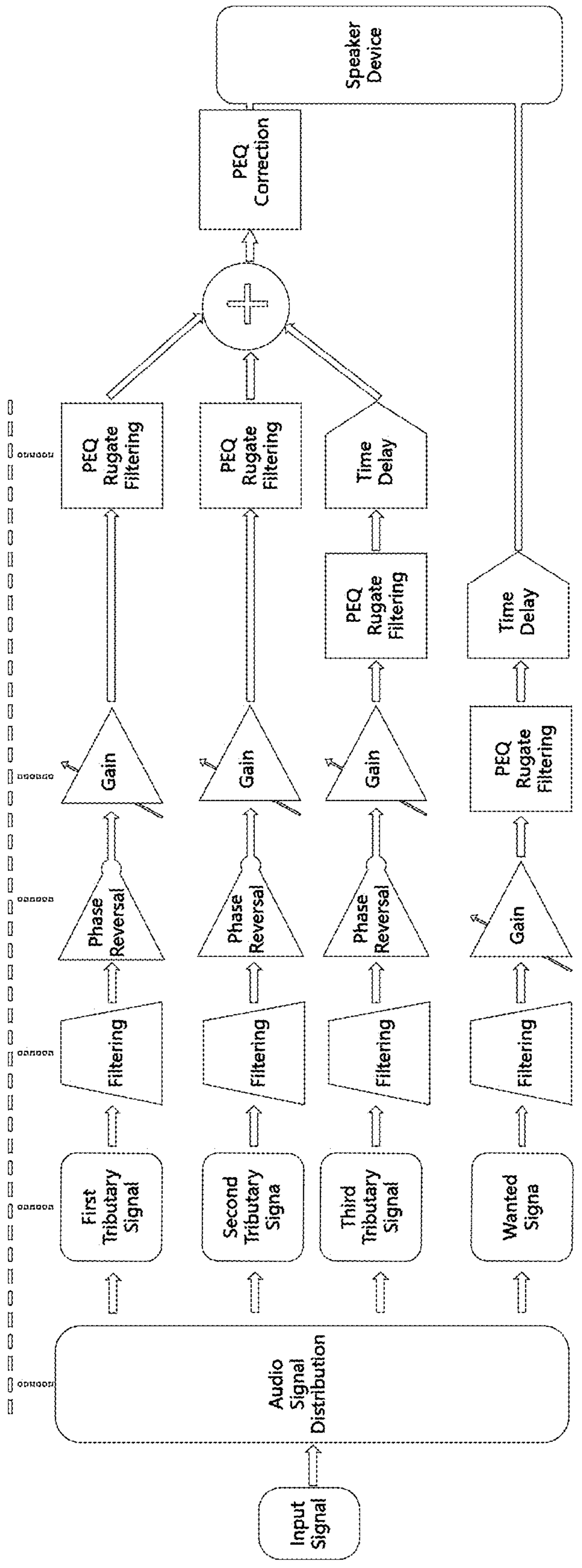
FIG. 9 is a schematic illustration of a specific embodiment of signal processing.

As a specific embodiment of the present disclosure, as shown in FIG. 9, the input signal is directionally distributed by an audio signal distributor into a wanted signal and three tributary signals. The wanted signal is filtered by a filter, gain-adjusted, PEQ comb-filtered, and time delayed before being transmitted to the first speaker unit 2. The first tributary signal is extracted by a filter in a specific frequency domain, then inverted, gain-adjusted, PEQ comb-filtered, and time delayed before being transmitted to the subsequent adder. The second tributary signal is extracted by a filter in a specific frequency domain, then inverted, gain-adjusted, and PEQ comb-filtered before being transmitted to the subsequent adder. The third tributary signal is extracted by a filter in a specific frequency domain, then inverted, gain-adjusted, and PEQ comb-filtered before being transmitted to the subsequent adder. The adder superimposes the processed first, second, and third tributary signals, and then PEQ fine-tunes the superimposed total tributary signal according to actual conditions. The processed total tributary signal is transmitted to the second speaker unit 8. At this point, the speaker device uses the signal processed by the method of one or more embodiments of the present disclosure to drive sound producing, achieving better open-field/far-field muffling effects.

In the fourth aspect, one or more embodiments of the present disclosure provides a head-mounted device comprising a processor, and a memory having stored thereon programs or instructions executable on the processor. When executed by the processor, the programs or instructions implement the steps of the signal processing method described above.

Alternatively, the head-mounted device includes AR/VR/MR/audio glasses.

Although embodiments of the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. A speaker device, comprising a first housing and a first speaker unit, the first speaker unit provided inside the first housing and separating the first housing into a first front sound cavity and a first rear sound cavity; the first housing is opened thereon with at least one first sound emission hole and at least one first sound leakage hole, the at least one first sound emission hole in communication with the first front sound cavity, and the at least one first sound leakage hole in communication with the first rear sound cavity; wherein each of the at least one first sound emission hole is spaced from each of the at least one first sound leakage hole by a first spacing distance, with at least one of the at least one first sound emission hole and at least one of the at least one first sound leakage hole provided facing a side towards a first muffling position, so that sound waves emitted therethrough are superimposed at the first muffling position.

2. The speaker device of claim 1, further comprises a second housing and a second speaker unit, the second speaker unit being provided inside the second housing and separating the second housing into a second front sound cavity and a second rear sound cavity; the second housing is opened thereon with at least one second sound emission hole, the at least second sound emission hole being in communication with the second front sound cavity;

the at least second sound emission hole is spaced from the at least first sound emission hole by a second spacing distance, with at least one of the second sound emission hole provided facing a side towards a second muffling position, so that sound waves emitted therethrough are superimposed at the second muffling position.

3. The speaker device of claim 2, wherein the second rear sound cavity is smaller in volume than the first rear sound cavity.

4. The speaker device of claim 2, wherein the second housing is provided thereon with a second sound leakage hole, which is in communication with the second rear sound cavity and is smaller than the first sound leakage hole.

5. The speaker device of claim 2, wherein the first housing and the second housing constitute an integrated structure.

6. The speaker device of claim 2, wherein the first muffling position and the second muffling position are in the same position.

7. A signal processing method, for being applied to a speaker device of claim 2, comprising:

distributing an input signal at least into a wanted signal and at least two tributary signals;

processing the wanted signal, and transmitting a processed wanted signal to a first speaker unit;

processing separately the tributary signals, superimposing processed tributary signals to form a total tributary signal, and transmitting the total tributary signal to a second speaker unit; wherein processing separately the tributary signals comprises filtering the tributary signals to extract signals in a specific frequency domain, and phase of each processed tributary signal is opposite to that of the wanted signal.

8. The signal processing method of claim 7, wherein processing the wanted signal comprises: filtering process, gain adjustment, PEQ comb filtering process, and time delay process.

9. The signal processing method of claim 7, wherein processing separately the tributary signals further comprises performing a gain adjustment and PEQ comb filtering process on the signals in the specific frequency domain.

10. The signal processing method of claim 9, wherein processing separately the tributary signals further comprises a phase reversal process before the gain adjustment, and/or a delay process after the PEQ comb filtering process.

11. The signal processing method of claim 7, wherein the total tributary signal is subjected to a PEQ correction before being transmitted to the second speaker unit.

12. A head-mounted device, comprising:

a processor; and a memory having stored thereon programs or instructions executable on the processor, wherein programs or instructions implement a signal processing method of claim 7 when being executed by the processor.

13. The speaker device of claim 2, wherein the second rear sound cavity is formed by the second housing and the second speaker unit, and the second rear sound cavity is of a volume smaller than or equal to 10% of that of the first rear sound cavity.

14. A head-mounted device, comprising a speaker device of claim 1.

15. The head-mounted device of claim 14, wherein the head-mounted device comprises AR/VR/MR/audio glasses, the AR/VR/MR/audio glasses comprising a frame and a temple, one end of the temple being provided on the frame, and the speaker device being provided on the temple.

16. The head-mounted device of claim 15, wherein the temple includes the first housing, a first side facing the frame, a second side facing away from the first side, a third side adjacent to the first side and facing an ear, and a fourth side facing away from the third, the first speaker unit being provided proximate to the third side of the temple; and wherein the first sound emission hole is opened on the third side of the temple, the first sound leakage hole is opened on both sides of the first sound emission hole along the extension direction of the third side of the temple, and the first sound leakage hole is opened on the second side of the temple.

17. The head-mounted device of claim 16, wherein the second side of the temple has a sunken part of a surface thereof to form a stepped structure, on which the first sound leakage hole is opened.

18. The head-mounted device of claim 16, further comprising a second speaker unit provided within the temple and being distal to the third side of the temple, and wherein the second sound emission holes are opened on the second side and the fourth side of the temple, and there are less second sound emission holes opened on the second side of the temple than those opened on the fourth side of the temple.

19. The speaker device of claim 1, further comprising:

connecting lines between one of the first sound emission holes, one of the first sound leakage holes, and the first muffling position, wherein the connecting lines constitute a triangle.

20. The speaker device of claim 1, wherein a center line of at least one of the first sound emission holes and a center line of at least one of the first sound leakage holes are provided to intersect.

* * * * *